United States Patent [19]

Röck et al.

[11] Patent Number: 4,576,506
[45] Date of Patent: Mar. 18, 1986

[54] JOINING DEVICE

[75] Inventors: Erich Röck, Höchst; Helmut Hollenstein, Dornbirn, both of Austria

[73] Assignee: Julius Blum Gesellschaft m.b.H., Höchst, Austria

[21] Appl. No.: 742,129

[22] Filed: Jun. 7, 1985

Related U.S. Application Data

[63] Continuation of Ser. No. 499,430, May 31, 1983.

[51] Int. Cl.⁴ ............................................. B25G 3/00
[52] U.S. Cl. ................................ 403/407.1; 403/245
[58] Field of Search ............. 403/230, 407, 406, 405, 403/231, 245, 323; 52/285

[56] References Cited

U.S. PATENT DOCUMENTS

| 459,361 | 9/1891 | Gregory . |
| 3,129,472 | 4/1964 | Hensel . |
| 4,047,822 | 9/1977 | Lehmann .......................... 52/285 X |
| 4,089,614 | 5/1978 | Harley ............................. 403/407 |
| 4,202,645 | 5/1980 | Giovannetti . |
| 4,292,003 | 9/1981 | Pond . |
| 4,325,649 | 4/1982 | Röck ............... 403/407 X |
| 4,348,130 | 9/1982 | Lautenschläger .................. 403/407 |
| 4,360,282 | 11/1982 | Koch ............................... 403/322 X |

FOREIGN PATENT DOCUMENTS

| 352940 | 10/1979 | Austria . |
| 3011788 | 1/1981 | Fed. Rep. of Germany . |
| 2442365 | 6/1980 | France . |
| 2074283 | 10/1981 | United Kingdom ................ 403/406 |

Primary Examiner—Dennis L. Taylor
Attorney, Agent, or Firm—Wenderoth, Lind & Ponack

[57] ABSTRACT

A joining device for connecting two furniture parts includes a dowel casing which is insertable into a bore in the side face of one furniture part and a screw that is screwed into the front face of the other furniture part. The screw is held in the dowel casing by a holding member which is a clamping element. The dowel casing is made of one piece and is open at its bottom. The holding member has an annular rim by which it is held by lateral projections of the dowel casing.

3 Claims, 4 Drawing Figures

JOINING DEVICE

This is a continuation of now abandoned application Ser. No. 449,430 filed May 31, 1983.

BACKGROUND AND FIELD OF THE INVENTION

The invention relates to to a joining device for joining at right angles two furniture parts, and including a cylindrical dowel casing of plastic material adapted to be inserted into a bore of one furniture part, such dowel casing having an aperture into which a pin-like joining member, e.g. a dowel pin or a screw, is eccentrically insertable with its head and fastenable to the dowel casing by means of a holding member pivotally mounted in the dowel casing to be immovable in the axial direction and having a holding surface in the form of a screw pressing on a head of the pin-like joining member in the mounted position.

The invention further relates to a method for producing a joining device for pieces of furniture of the aforementioned kind.

DESCRIPTION OF THE PRIOR ART

Joining devices of this kind are preferably used for releasably joining two cabinet walls. The dowel casing is inserted at the edge of the side or edge face of one cabinet wall, while the other pin-like joining member is inserted into the front side of the furniture wall to be joined. The joining device is usually eccentrically fixed in the dowel casing. This is due to the fact that there should be no projecting edges when the furniture parts have been joined. A coaxial arrangement in the dowel casing of the aperture receiving the joining device would make the dowel casing project on all sides and, hence, the respective furniture wall also would project.

When assembling the piece of furniture, the dowel casing is driven into the side of one furniture part, and the joining device is screwed or pushed into the front side of the other furniture part. Then, the furniture parts are placed together, with the head of the joining device inserted into the aperture in the dowel casing and retained by means of the holding member.

To permit insertion of the holding member into the dowel casing, known joining devices of this kind have a two-part dowel casing so that it can be opened to receive the holding member, and then the two halves of the dowel casing are joined.

One-piece dowel casings are known, but only with joining devices in which the holding member is a screw which is axially displaced when turned in the dowel casing. Such holding members do not have, however, the desired holding properties, and problems arise in particular in the transmission of forces from the holding member to the dowel casing.

SUMMARY OF THE INVENTION

It is the object of the invention to provide a joining device of the afore-mentioned kind in which the dowel casing can be a one-piece member and in which the holding member is absolutely securely retained in the dowel casing before the mounting of the joining device.

According to the invention this is achieved by providing a one-piece dowel casing having an open front face to be directed into a bore in the one furniture part and by providing the holding member with an annular rim, the holding member being rotatably retained at the rim by means of an inwardly protruding lateral projection or projections, the plastic material of the projections being advantageously thermally deformed.

This design of the dowel casing and of the joining device has essential advantages when mounting the holding member in the dowel casing. It is, in particular, easier to mount the holding member fully automatically in the dowel casing than with known joining devices for furniture parts.

The method according to the invention provides that the plastic material of the dowel casing is, at the annular rim of the holding member, deformed by pressure and pressed over the rim of the holding member. Heat can be applied.

It is advantageously provided that when the dowel casing is injection molded a retaining projection or projections are formed below the seat for the holding member, which then latches behind the projection or projections, and that subsequently plastic material in the region of the projection or projections is deformed by pressure, whereby heat may be applied.

Hence, the holding member is pre-mounted and cannot be removed inadvertently, even in cases where the dowel casing has to be transported to the site where the plastic material is melted.

BRIEF DESCRIPTION OF THE DRAWINGS

In the following the invention will be described in more detail with reference to the accompanying drawings without being restricted to the illustrated embodiments, and wherein.

DESCRIPTION OF THE PREFERRED EMBODIMENTS

Figure 1:
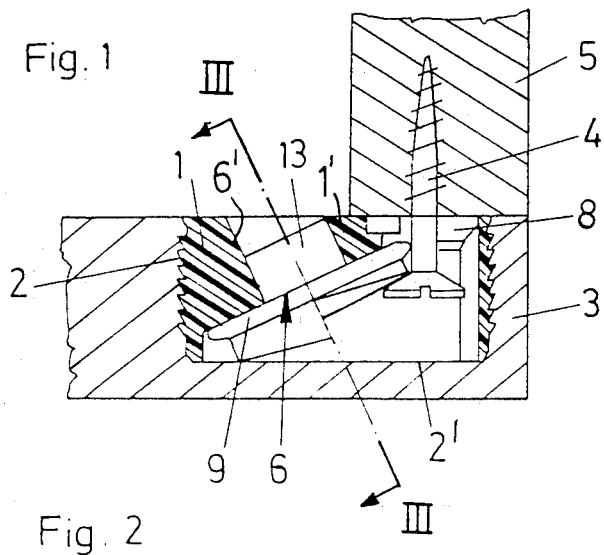
FIG. 1 is a sectional view of two furniture parts angularly connected by means of a joining device according to the invention.
Figure 2:
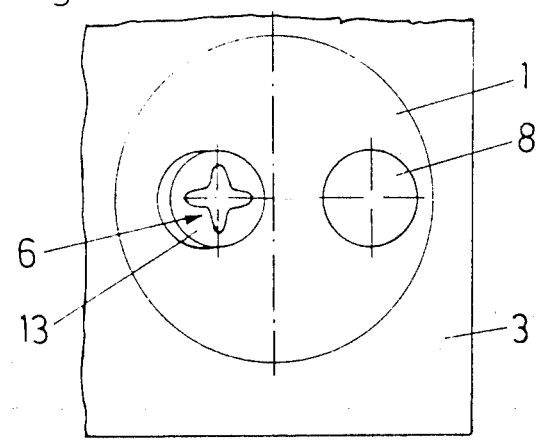
FIG. 2 is a top view of a joining device of FIG. 1 according to the invention.

As can be seen from FIG. 1, a dowel casing 1 according to the invention is inserted into a bore 2 in the side face at the edge of a furniture wall 3. The joining member 4, which is a screw in the illustrated embodiment, extends into the front edge or face of a corresponding furniture wall 5. When the piece of furniture is in the mounted condition, the dowel casing 1 and the joining member 4 are connected by means of a holding member 6. The dowel casing 1 is in the shape of a cylindrical member having an open lower end, as viewed in FIG. 1, and an upper end closed by an integral transverse portion 1' having therein an inclined orifice 6' into which extends a base 13 of holding member 6. Base 13 is accessible from the upper end of dowel casing 1 and has a tool engaging portion, as shown in FIG. 2, by which holding member 13 may be rotated about the axis of base 13.

To improve the fit of the dowel casing 1 in the respective furniture wall 3, casing 1 may be provided with external circumferential clamping ribs.

When the dowel casing 1 is pressed into the furniture wall 3, particular care must be taken that an aperture 8 in cap portion 1 for receiving the joining member 4 is exactly aligned with the position of the joining member 4 in the mounted position. Only slight displacement of the dowel casing 1 would make a connection between the two furniture parts 3, 5 impossible.

As can be seen from the drawings, the dowel casing 1 is one piece and is open at its lower end directed towards the bore bottom 2' in the furniture part 3. Hence, the holding member 6 can be pressed into the dowel casing 1 from below, i.e. from the open lower end.

Figure 3:
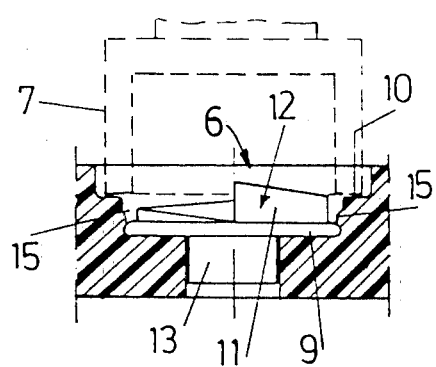
FIG. 3 is a sectional view along line III—III of FIG. 1, the holding member being turned by 90° and pre-mounted.
Figure 4:
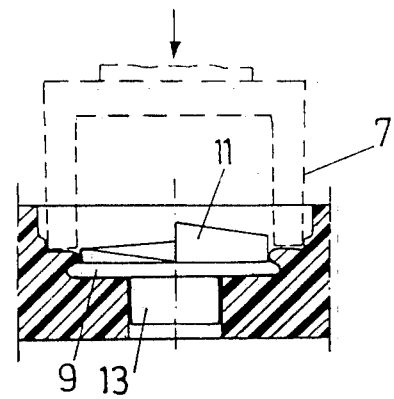
FIG. 4 is a sectional view similar to FIG. 3, the holding member being in the final mounted position.

As shown in FIG. 3, the dowel casing has undercuts formed by projections 15 below which an annular rim 9 of the holding member 6 engages. Hence, the holding member 6 latches into the dowel casing 1. Then an annular heating member 7 is pressed onto shoulders 10 of transverse portion 1' and the plastic material of the dowel casing 1 is thermally deformed to such a degree that it rests against an external boundary face 11 of a cam surface portion 12 of the holding member 6. The holding member is thus absolutely safely retained in the dowel casing 1. Deformation can also be obtained by compression.

When the piece of furniture is mounted, the screw forming the joining member 4 protrudes through the aperture 8 of the dowel casing 1, and the holding member 6 is turned by means of a screw driver engaging in a base 13 of member 6.

What is claimed is:

1. A joining device for joining at right angles two furniture parts, said joining device comprising:
   a plastic cylindrical dowel casing adapted to be inserted into a bore in one furniture part;
   said dowel casing having an open first end to be directed into the bore and a second end closed by an integral transverse portion;
   an aperture extending eccentrically through said transverse portion for receipt therethrough of a head of a connecting pin to be fastened to the other furniture part;
   a holding member rotatably mounted in said transverse portion of said dowel casing, said holding member including a base accessible from said second end of said dowel casing and engageable by a tool for rotation of said holding member about said base;
   said holding member having a cam surface portion facing said open first end and adapted to press on the head of the connecting pin upon rotation of said holding member;
   said holding member having an annular rim extending outwardly beyond said cam surface portion and abutting on said transverse portion of said dowel casing;
   said dowel casing comprising an integral one-piece member of rigid construction throughout;
   said dowel casing including at least one integral projection fitting over said annular rim of said holding member; and
   a portion of the plastic material of said transverse portion being deformed over said annular rim, thereby retaining said holding member in said dowel casing to prevent relative axial movement therebetween.

2. A method for forming a joining device for joining at right angles two furniture parts, said method comprising:
   injection molding from a plastic material a cylindrical dowel casing in the form of an integral one-piece member of rigid construction throughout, such that said dowel casing has an open first end, a second end closed by a transverse portion having extending therethrough an eccentrically positioned aperture and an inclined orifice, and at least one projection;
   providing a holding member having a base including means to be engaged by a tool, a cam surface portion, and an annular rim between said base and said cam surface portion and extending outwardly beyond said cam surface portion;
   inserting said holding member into said dowel casing from said first open end thereof and extending said base through said inclined orifice, such that said annular rim is engaged by said projection, and such that said tool engaging means is accessible from said second end of said dowel casing; and
   deforming a portion of the plastic material of said transverse portion over said annular rim by applying pressure to said plastic material portion thereby retaining said holding member in said dowel casing and preventing relative axial movement therebetween.

3. A method as claimed in claim 2, wherein said deforming further comprises applying heat to said plastic material portion.

* * * * *